Patented Feb. 16, 1932

1,845,250

UNITED STATES PATENT OFFICE

JOHN H. DRISCOLL, OF BOSTON, MASSACHUSETTS

ABRASIVE COMPOUND

No Drawing.   Application filed January 20, 1930.   Serial No. 422,226.

My invention relates to abrasive compounds and particularly to abrasive compounds such as are employed in grinding valves.

An objectionable feature heretofore characterizing most compounds of the class referred to has been that when exposed to the atmosphere they would lose their moisture content in a comparatively short time so as to become hard and unusable. Sometimes, also, exposure to the atmosphere would cause a tough rubber-like skin or layer to form on the mass which also resulted in waste.

The principal object of the present invention is to obviate the objectionable features just referred to, but it is also an object of this invention to provide a "water mixing" compound of the class described which will not induce or aid corrosion of metals; which will be of smooth and uniform consistency; which will not be injuriously affected by abnormally low temperatures, and which, if left standing, will not disintegrate or separate but will retain the original distribution of its elements.

To these ends I have provided an improved abrasive compound which is made as follows:

I first produce two mixtures one of which consists of a potassium soap that is produced by heating and melting approximately thirty parts of stearic acid and adding, while heating and stirring, a solution of approximately six parts of potassium hydroxide and approximately twenty parts of water and then, after saponification has taken place, adding water to make one hundred parts.

The other mixture is produced by melting approximately five parts of a mixture consisting of approximately fifty percent of beeswax and fifty percent of japan wax with approximately ten parts of paraffin oil.

With this wax and oil combination is intimately mixed fifty parts, approximately, of the above described potassium soap mixture.

I then stir into this mass a mixture of approximately fifteen parts glycerine and approximately thirty parts of water.

To this combination is then added approximately seventy-five parts of silicon carbide and approximately twenty-five parts of electrically fused alumina.

All of these operations are performed in a water jacketed kettle at a temperature of about sixty degrees centigrade.

After agitating until the abrasive is thoroughly distributed throughout the mass, I raise the temperature thereof until the water in the jacket is at a boil. These conditions are then maintained while continuously stirring until the mixture thickens to a stiff paste.

To this paste compound I sometimes add a coloring pigment such as carbon black, and an essential oil, as methyl salicylate.

The above described abrasive compound is characterized by a very much slower rate of evaporation of its moisture content than is the case with those compounds of this class as heretofore produced and with which I am familiar. This moisture retaining characteristic of my improved compound is due to the hygroscopic nature of the potassium soap and the protecting or shielding action of the oil in emulsion. It also has the advantage that a tough rubber-like film will not, as heretofore, form on my compound on exposure to the atmosphere for any reasonable time, and the compound can always be quickly thinned with water because of its affinity for moisture and its great absorbency. Since the compound is chemically neutral, or slightly basic, and contains no formaldehyde nor calcium chloride, it will not induce or aid corrosion of metals, but by its nature will rather retard the same. The proportions of soap and oil in my compound are not sufficient to mask the abrasive action thereof appreciably, but give to the compound smoothness and uniformity.

This compound will resist cold to a relatively low temperature without congealing, but if frozen at an abnormally low temperature, no serious change, or separation of its elements, takes place and it returns promptly to its original condition upon thawing and stirring. Prolonged standing of my compound will not cause separation of its elements and it will maintain its original consistency.

I do not desire to limit myself to the exact proportions given above as some variation is obviously possible without materially affecting the general nature or efficiency of my compound. Also I do not desire to limit myself to the use of beeswax, japan wax, or any particular combination of the two, as similar results may be obtained with other waxes having corresponding properties.

It is also true that fair results may be obtained by the use of soaps other than stearate of potassium, as for instance soaps made with other fatty acids, or with other saponifying agents.

Other abrasives than those above mentioned may be substituted and if desired a single abrasive alone may be used. Also several other fixed oils will form good emulsions and give satisfactory results so that I do not desire to limit myself to the use of paraffin oil. Satisfactory results may also be obtained with other non-drying ingredients, as for instance certain other glycols, which may be used instead of the glycerine referred to above. Changing market prices of such elements would probably be the controlling factor in the matter of selection.

What I claim is:—

1. An abrasive valve grinding compound consisting of a homogenized pasty mixture of a hygroscopic potassium soap; wax; a fixed emulsifying oil; glycerine; water, and comminuted metal-cutting abrasive proportioned and compounded substantially as described.

2. A valve grinding paste consisting of a soap made up of stearic acid, potassium hydroxide and water compounded with a mixture of beeswax, japan wax and paraffin oil, and including also glycerine, silicon carbide and fused almina mixed with said compound to form a homogenous pasty mass.

Signed by me at Boston, Suffolk County, Massachusetts, this second day of January, 1930.

JOHN H. DRISCOLL.